United States Patent [19]

Chen

[11] Patent Number: 4,957,128
[45] Date of Patent: Sep. 18, 1990

[54] COMPACT, VIBRATING-TYPE CONTACT LENS CLEANER

[76] Inventor: Ching-Shih Chen, No. 18, Shuang-Hsi St., Sheh-Lin Dist., Taipei, Taiwan

[21] Appl. No.: 442,067

[22] Filed: Nov. 28, 1989

[51] Int. Cl.⁵ .................................................. B08B 3/12
[52] U.S. Cl. ...................................... 134/118; 134/140; 134/159; 206/5.1; 366/111; 366/128; 366/211
[58] Field of Search ............... 134/117, 118, 140, 158, 134/159, 184; 366/110, 111, 112, 114, 128, 210, 211, 212, 213, 215, 216, 237; 206/5.1

[56] References Cited

U.S. PATENT DOCUMENTS

| | | | |
|---|---|---|---|
| 1,100,852 | 6/1914 | Thieme | 366/111 |
| 2,514,078 | 7/1950 | Lee | 366/128 |
| 3,640,294 | 2/1972 | Piccolo | 134/117 |
| 4,026,531 | 5/1977 | Luchsinger et al. | 366/211 |
| 4,684,259 | 8/1987 | Rice et al. | 366/213 X |
| 4,839,684 | 6/1989 | Michelson et al. | 366/211 X |

Primary Examiner—Philip R. Coe
Attorney, Agent, or Firm—Ladas & Parry

[57] ABSTRACT

A contact lens cleaner includes a base, a vibrating plate mounted swingably on the base, a container mounted removably on the vibrating plate so as to receive an amount of a cleaning liquid and a contact lens therein, a motor disposed on the base so as to swing the vibrating plate, a cam member mounted rotatably on the base and having a cam surface which is engaged with the free end of the vibrating plate, and a resilient element biasing the free end of the vibrating plate toward the cam member. When the motor is started so as to rotate the cam member, the cam surface of the cam member pushes the free end of the vibrating plate to move in one direction, while the resilient element moves the free end of the vibrating plate in the opposite direction to engage with the cam surface of the cam member, so as to swing the vibrating plate, thereby rinsing the contact lens with the cleaning liquid.

2 Claims, 3 Drawing Sheets

COMPACT, VIBRATING-TYPE CONTACT LENS CLEANER

BACKGROUND OF THE INVENTION

This invention relates to a contact lens cleaner, more particularly to a vibrating-type contact lens cleaner.

A conventional contact lens cleaner normally includes a porous container in which a cleaning liquid and one or two contact lenses are received. When the container is power operated to rotate, the impurities on the contact lenses to be cleaned are removed from the container by centrifugal force. Although the above-mentioned rotating type cleaners can efficiently clean contact lenses, they are too bulky to carry conveniently due to the fact that a complex speed reduction mechanism must be interposed between an electric motor and the container.

SUMMARY OF THE INVENTION

It is therefore the main object of this invention to provide a compact vibrating-type contact lens cleaner.

According to this invention, a contact lens cleaner includes a base, a vibrating plate mounted swingably on the base, a container mounted removably on the vibrating plate so as to receive an amount of a cleaning liquid and a contact lens therein, a motor disposed on the base so as to swing the vibrating plate, a cam member mounted rotatably on the base and having a cam surface which is engaged with the free end of the vibrating plate, and a resilient element biasing the free end of the vibrating plate toward the cam member. When the motor is started so as to rotate the cam member, the cam surface of the cam member pushes the free end of the vibrating plate to move in one direction, while the resilient element moves the free end of the vibrating plate in the opposite direction to engage with the cam surface of the cam member, so as to swing the vibrating plate, thereby rinsing the contact lens with the cleaning liquid. In one embodiment, the vibrating plate includes two gripping arms projecting upward from two opposite side portions of the upper surface of the vibrating plate to engage the retaining notches of the container with the barb-like ends of the gripping arms so as to retain the container on the upper surface of the vibrating plate, and a resilient sheet extending obliquely from the upper surface of the vibrating plate to contact the bottom surface of the container.

BRIEF DESCRIPTION OF THE DRAWING

Other features and advantages of this invention will become apparent in the following detailed description of a preferred embodiment of this invention, with reference to the accompanying drawings in which.

DETAILED DESCRIPTION OF THE PREFERRED EMBODIMENT

Figure 1:
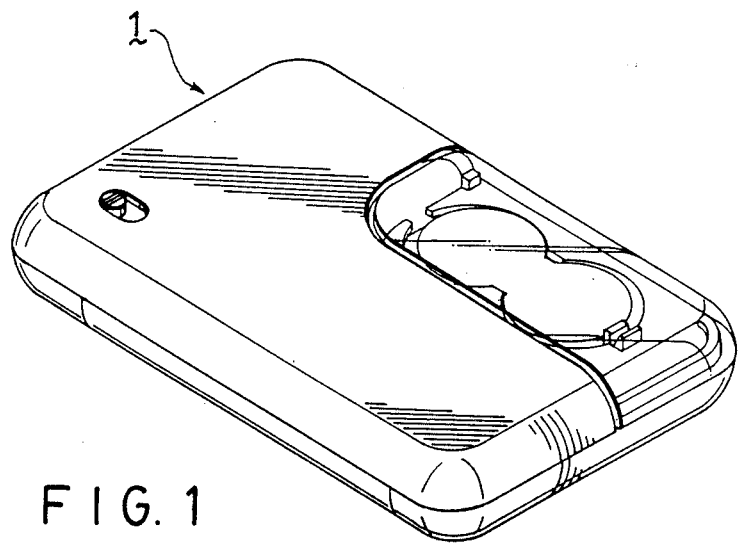
FIG. 1 is a perspective view of a compact vibrating-type contact lens cleaner according to this invention.
Figure 2:
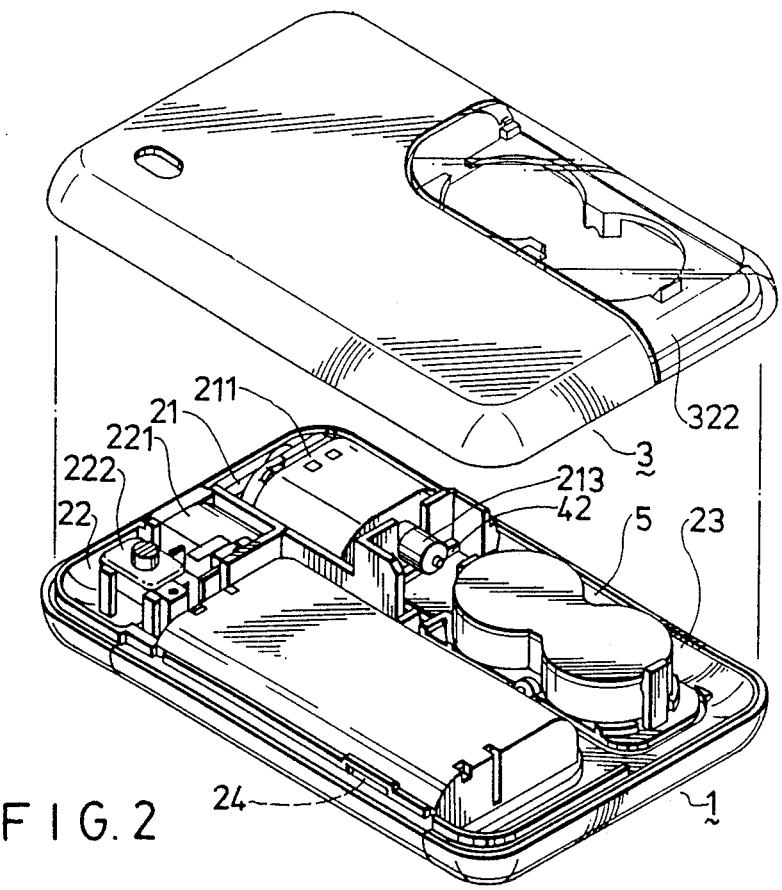
FIG. 2 is a perspective view showing the structure of the interior of the compact vibrating-type contact lens cleaner according to this invention.
Figure 3:
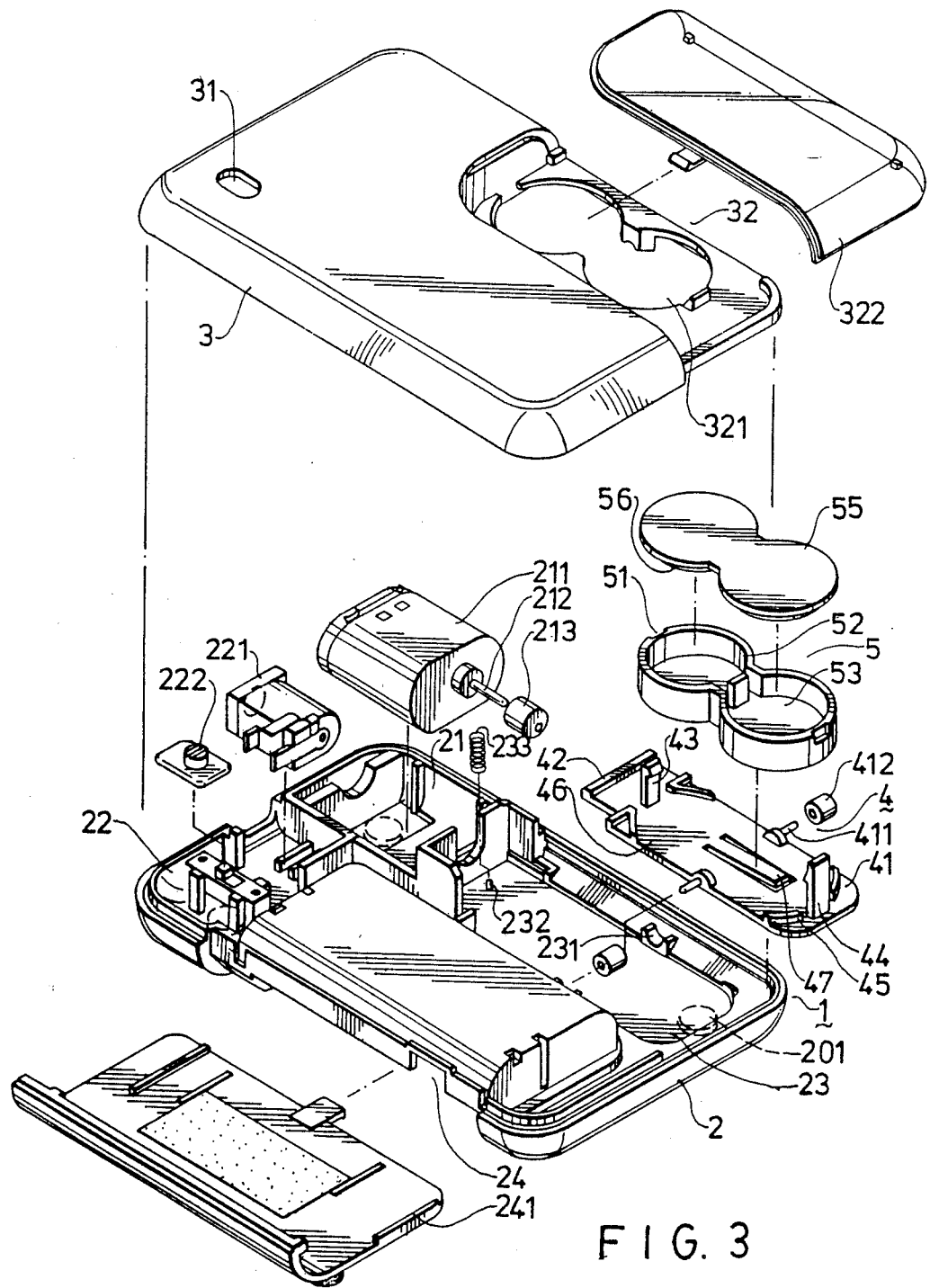
FIG. 3 is an exploded view showing the compact vibrating-type contact lens cleaner according to this invention.

Referring to FIGS. 1-3, a contact lens cleaner of this invention includes a body 1 which consists of a base 2 and a top cover 3. The top cover 3 is connected removably to the base 2. The base 2 has a power supply accommodating space 21, a switch accommodating space 22, an operating unit accommodating space 23 and a battery accommodating chamber 24. A bottom cover 241 is connected removably to the bottom surface of the base 2 so as to close the battery accommodating chamber 24. An electric motor 211 is disposed within the power supply accommodating space 21 and has a motor shaft 212 which extends into the operating unit accommodating space 23. A cam member 213 is sleeved rigidly on the motor shaft 212.

A rectifier socket unit 221 and a control switch 222 are installed within the switch accommodating space 22. The top cover 3 has an elliptic opening 31 through which the control switch 222 extends. Two generally U-shaped supports 231 are provided in two opposite side portions of the operating unit accommodating space 23.

A vibrating unit 4 includes a plastic vibrating plate 41 with two pivot pins 411 extending from two sides thereof. Two rubber bushings 412 are respectively and tightly sleeved on the pivot pins 411 and are placed on the supports 231. When the top cover 3 is coupled with the base 2, the bushings 412 are confined and rotatable between the cover 3 and the supports 231. A rib 42 extends upward from the left end of the upper surface of the vibrating plate 41 to engage with the cam surface of the cam member 213. The vibrating plate 41 includes two gripping arms 43, 44 extending upward from two end portions of the upper surface thereof. The gripping arms 43, 44 have barb-like ends engaged within the retaining notches 51 of a container 5 and retain the container 5 on the upper surface of the vibrating plate 41. The contour of the container 5 is shaped like the numeral "8." Two intercommunicated circular chambers 52, 53 are formed in the container 5 so as to accommodate a pair of contact lenses therein. A cover plate 55 is provided on the bottom surface thereof with a boss 56 which has a contour shaped to conform to the upper end opening of the container 5. When the boss 56 of the cover plate 55 is inserted into the upper end opening of the container 5, the top cover 3 is attached to the base 2 so as to retain the cover plate 55 on the container 5. Four ribs 45 are provided on the upper surface of the vibrating plate 41 and incorporated with the gripping arms 44 to enclose the bottom of the container 5. An opening 321 is formed in the top cover 3 in alignment with the container 5 and has a shape conforming to the latter. A transparent plate 322 is placed into the recess 32 in the top cover 3 and is connected removably to the top cover 3.

Figure 4:
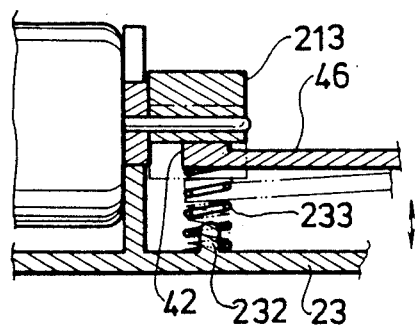
FIG. 4 is a sectional view illustrating means for vibrating the lens container of the compact vibrating-type contact lens cleaner in accordance with this invention.

As shown in FIGS. 3 and 4, a coiled spring 233 is sleeved on a post 232 which extends upward from the upper surface of the base 2 in the operating unit accommodating space 23. The spring 233 pushes the rib 42 of the vibrating plate 41 to contact the cam surface of the cam member 213. A resilient sheet 47 extends obliquely from the upper surface of the vibrating plate 41 to contact the middle portion of the bottom of the container 5. When a pair of contact lenses and an amount of a cleaning liquid are received in the container 5, and the motor 211 is started to rotate the cam member 213, the vibrating plate 41 is swung with the assistance of the spring 233 and the resilient sheet 47. As a result of the swinging of the vibrating plate 41, the cleaning liquid is vibrated to rinse the contact lenses in the container 5.

With this invention thus explained, it is apparent that numerous modifications and variations can be made without departing from the scope and spirit of this invention. It is therefore intended that this invention be limited only as indicated in the appended claims.

I claim:

1. A contact lens cleaner comprising a base, a swingable vibrating plate with a free end mounted swingably on said base, a container mounted removably on said vibrating plate so as to receive an amount of a cleaning liquid and a contact lens therein, said container having two retaining notches formed in upper ends of two opposite side walls thereof, and said vibrating plate includes two gripping arms with barb-like ends projecting upward from an upper surface of said vibrating plate to engage said retaining notches with said barb-like ends of said gripping arms so as to retain said container on said upper surface of said vibrating plate; a motor disposed on said base so as to swing said vibrating plate, a cam member mounted rotatably on said base and having a cam surface which is engaged with said free end of said vibrating plate, and a resilient element biasing said free end of said vibrating plate toward said cam member, whereby, when said motor is started so as to rotate said cam member, said cam surface of said cam member pushes said free end of said vibrating plate to move in one direction, while said resilient element moves said free end of said vibrating plate in the opposite direction to engage with said cam surface of said cam member, so as to swing said vibrating plate, thereby rinsing said contact lens with said cleaning liquid.

2. A contact lens cleaner as claimed in claim 1, wherein said vibrating plate includes a resilient sheet extending obliquely from said upper surface of said vibrating plate to contact a bottom surface of said container; whereby, said resilient sheet can facilitate vibratory movement of said container.

* * * * *